(12) United States Patent
Beebe et al.

(10) Patent No.: US 10,733,911 B2
(45) Date of Patent: *Aug. 4, 2020

(54) THREE-DIMENSIONAL RIBS AND METHOD OF THREE-DIMENSIONAL PRINTING OF RIBS FOR CRASH TEST DUMMY

(71) Applicant: Humanetics Innovative Solutions, Inc., Plymouth, MI (US)

(72) Inventors: Michael S. Beebe, Norwalk, OH (US); Thomas M. Vara, Norwalk, OH (US)

(73) Assignee: Humanetics Innovative Solutions, Inc., Plymouth, MI (US)

( * ) Notice: Subject to any disclaimer, the term of this patent is extended or adjusted under 35 U.S.C. 154(b) by 467 days.

This patent is subject to a terminal disclaimer.

(21) Appl. No.: 15/293,100

(22) Filed: Oct. 13, 2016

(65) Prior Publication Data
US 2017/0110033 A1   Apr. 20, 2017

Related U.S. Application Data

(60) Provisional application No. 62/241,548, filed on Oct. 14, 2015.

(51) Int. Cl.
*G09B 23/30* (2006.01)
*G09B 23/00* (2006.01)
*G01L 5/24* (2006.01)
*B29C 64/106* (2017.01)
*G09B 23/28* (2006.01)
*G01M 17/007* (2006.01)
(Continued)

(52) U.S. Cl.
CPC ............ *G09B 23/30* (2013.01); *B29C 64/106* (2017.08); *G09B 23/00* (2013.01); *G09B 23/28* (2013.01); *B33Y 10/00* (2014.12); *B33Y 80/00* (2014.12); *G01L 5/243* (2013.01); *G01M 17/0078* (2013.01)

(58) Field of Classification Search
CPC ..... G09B 23/30; B29C 64/106; B29C 64/118; B29C 64/112; B33Y 10/00; B33Y 80/00
See application file for complete search history.

(56) References Cited

U.S. PATENT DOCUMENTS 3,664,038 A   5/1972   Searle et al.
3,753,302 A   8/1973   Daniel
(Continued)

FOREIGN PATENT DOCUMENTS

CA   2881170 A1   8/2016
CN   101286188 B   6/2010
(Continued)

OTHER PUBLICATIONS

Senese, "MarkForged Lets You 3D Print with Carbon Fiber and Kevlar on a Budget", Makezine 2015, https://makezine.com/2015/01/15/3d-printed-carbon-fiber-markforged/ (Year: 2015).*

(Continued)

*Primary Examiner* — Eric S. McCall
*Assistant Examiner* — Timothy P Graves
(74) *Attorney, Agent, or Firm* — Howard & Howard Attorneys PLLC

(57) ABSTRACT

A three-dimensional rib for a crash test dummy includes at least two layers of a band material and a layer of damping material sandwiched in between the at least two layers of the band material.

15 Claims, 5 Drawing Sheets

(51) Int. Cl.
B33Y 10/00 (2015.01)
B33Y 80/00 (2015.01)

(56) References Cited

U.S. PATENT DOCUMENTS

| | | |
|---|---|---|
| 4,044,404 A | 8/1977 | Martin et al. |
| 4,261,113 A | 4/1981 | Alderson |
| 4,701,132 A | 10/1987 | Groesch et al. |
| 5,018,977 A | 5/1991 | Wiley et al. |
| 5,030,235 A | 7/1991 | Campbell, Jr. |
| 5,261,908 A | 11/1993 | Campbell, Jr. |
| 5,317,931 A | 6/1994 | Kalami |
| 5,518,407 A | 5/1996 | Greenfield et al. |
| 5,526,707 A | 6/1996 | Smrcka |
| 5,620,326 A | 4/1997 | Younker |
| 5,741,989 A | 4/1998 | Viano et al. |
| 6,146,567 A | 11/2000 | Sachs et al. |
| 6,206,703 B1 | 3/2001 | O'Bannon |
| 6,439,070 B1 | 8/2002 | Beebe et al. |
| 6,610,429 B2 | 8/2003 | Bredt et al. |
| 6,623,687 B1 | 9/2003 | Gervasi et al. |
| 6,658,314 B1 | 12/2003 | Gothait |
| 6,749,433 B2 | 6/2004 | Kassai et al. |
| 6,931,951 B2 | 8/2005 | Wright et al. |
| 6,982,409 B2 | 1/2006 | Huang et al. |
| 7,086,273 B2 | 8/2006 | Lipmyer |
| 7,261,542 B2 | 8/2007 | Hickerson et al. |
| 7,508,530 B1 | 3/2009 | Handrnan |
| 7,718,351 B2 | 5/2010 | Ying et al. |
| 7,767,130 B2 | 8/2010 | Elsner et al. |
| 7,930,920 B2 | 4/2011 | Le Carpentier |
| RE42,418 E | 6/2011 | Lipmyer |
| 7,993,140 B2 | 8/2011 | Sakezles |
| 8,454,368 B2 | 6/2013 | Ault et al. |
| 8,481,241 B2 | 7/2013 | Napadensky et al. |
| 8,500,452 B2 | 8/2013 | Trotta et al. |
| 8,616,872 B2 | 12/2013 | Matsui et al. |
| 8,663,326 B2 | 3/2014 | Osman |
| 8,840,404 B2 * | 9/2014 | Arthur .................. G09B 23/28 434/274 |
| 8,874,248 B2 | 10/2014 | Young et al. |
| 9,063,029 B2 | 6/2015 | Forbes et al. |
| 9,183,764 B2 | 11/2015 | Sugimoto et al. |
| 9,243,966 B2 | 1/2016 | Beillas et al. |
| 9,315,043 B2 | 4/2016 | Murphy et al. |
| 9,326,860 B2 | 5/2016 | Osman |
| 9,355,575 B2 | 5/2016 | Wang |
| 9,387,658 B2 | 7/2016 | Chen et al. |
| 9,456,884 B2 | 10/2016 | Uckelmann et al. |
| 9,468,467 B2 | 10/2016 | Rathbun et al. |
| 9,505,176 B2 | 11/2016 | Ederer |
| 9,999,509 B2 * | 6/2018 | Dikovsky .......... A61C 13/0019 |
| 10,395,561 B2 | 8/2019 | Vara et al. |
| 2002/0079601 A1 | 6/2002 | Russell et al. |
| 2003/0066365 A1 | 4/2003 | Biermann et al. |
| 2004/0099825 A1 | 5/2004 | Huang et al. |
| 2004/0126746 A1 | 7/2004 | Toly |
| 2004/0156478 A1 | 8/2004 | Appleby et al. |
| 2005/0126258 A1 | 6/2005 | Lipmyer |
| 2006/0075826 A1 * | 4/2006 | Roberts .................. G01N 3/48 73/788 |
| 2007/0058163 A1 | 3/2007 | Handman |
| 2007/0238081 A1 | 10/2007 | Koh |
| 2008/0293029 A1 | 11/2008 | Wilkins et al. |
| 2009/0246747 A1 | 10/2009 | Buckman, Jr. |
| 2011/0197688 A1 | 8/2011 | Forbes et al. |
| 2012/0178845 A1 | 7/2012 | Napadensky et al. |
| 2012/0190793 A1 | 7/2012 | Halter et al. |
| 2012/0224755 A1 | 9/2012 | Wu |
| 2012/0232857 A1 | 9/2012 | Fisker et al. |
| 2012/0280988 A1 | 11/2012 | Lampotang et al. |
| 2013/0000426 A1 | 1/2013 | Arthur et al. |
| 2013/0069936 A1 | 3/2013 | Tsai et al. |
| 2014/0017651 A1 * | 1/2014 | Sugimoto ............... G09B 23/30 434/272 |
| 2014/0023996 A1 | 1/2014 | Finn et al. |
| 2014/0106329 A1 | 4/2014 | Watanabe et al. |
| 2014/0142914 A1 | 5/2014 | Rapoport |
| 2014/0302306 A1 | 10/2014 | Merkle et al. |
| 2014/0329217 A1 | 11/2014 | Barsness et al. |
| 2015/0025666 A1 | 1/2015 | Olivieri et al. |
| 2015/0032242 A1 | 1/2015 | Schouwenburg et al. |
| 2015/0086955 A1 | 3/2015 | Poniatowski et al. |
| 2015/0111994 A1 | 4/2015 | Sakane |
| 2015/0119994 A1 | 4/2015 | Kang et al. |
| 2015/0325151 A1 | 11/2015 | Tuchschmid et al. |
| 2015/0343708 A1 | 12/2015 | Gerstle et al. |
| 2016/0001469 A1 | 1/2016 | Bacchereti et al. |
| 2016/0046078 A1 | 2/2016 | Sun et al. |
| 2016/0101338 A1 | 4/2016 | Daniels et al. |
| 2016/0115297 A1 | 4/2016 | Norikane et al. |
| 2016/0122723 A1 | 5/2016 | Retting et al. |
| 2016/0148541 A1 | 5/2016 | Ristolainen et al. |
| 2016/0159006 A1 | 6/2016 | Wang et al. |
| 2016/0287339 A1 | 10/2016 | Bin Abdul Rahman et al. |
| 2016/0334780 A1 | 11/2016 | Dair et al. |
| 2016/0372011 A1 | 12/2016 | Bernal |
| 2017/0001439 A1 | 1/2017 | Foresti et al. |
| 2017/0162077 A1 | 6/2017 | Vara et al. |
| 2017/0301262 A1 | 10/2017 | Vara et al. |
| 2017/0301264 A1 | 10/2017 | Vara et al. |

FOREIGN PATENT DOCUMENTS

| | | |
|---|---|---|
| CN | 202844516 U | 4/2013 |
| CN | 103357157 A | 10/2013 |
| CN | 103400006 A | 11/2013 |
| CN | 203275061 U | 11/2013 |
| CN | 203665958 U | 6/2014 |
| CN | 103966219 A | 8/2014 |
| CN | 104462650 A | 3/2015 |
| CN | 204576946 U | 8/2015 |
| CN | 204924607 U | 12/2015 |
| CN | 103400006 B | 2/2016 |
| CN | 105741354 A | 7/2016 |
| DE | 3503577 C2 | 2/1988 |
| DE | 3715143 C1 | 9/1988 |
| DE | 10356980 A1 | 7/2005 |
| EP | 2072991 A1 | 6/2009 |
| EP | 1388833 B1 | 9/2009 |
| EP | 2098850 A2 | 9/2009 |
| EP | 2 692 509 A1 | 5/2014 |
| FR | 2018158 A1 | 5/1970 |
| FR | 2700206 A1 | 7/1994 |
| GB | 2244843 B | 4/1994 |
| JP | 2006258752 A | 9/2006 |
| JP | 2011508204 A | 3/2011 |
| JP | 5637030 B2 | 12/2014 |
| KR | 20150121525 A | 10/2015 |
| WO | 0238039 A2 | 5/2002 |
| WO | 02038039 A3 | 10/2002 |
| WO | 2009082211 A1 | 7/2009 |
| WO | 2015161367 A1 | 10/2015 |
| WO | 2015184015 A1 | 12/2015 |
| WO | 2016061148 A1 | 4/2016 |

OTHER PUBLICATIONS

NHTSA, Parts List and Drawings—THOR-M Advanced Frontal Crash Test Dummy, p. 64, Thorax Elliptical Rib #1 Assembly (Year: 2014).*

English language abstract and computer-generated English language translation for CN101286188B extracted from Thomson database on Dec. 12, 2016, 12 pages.

English language abstract and computer-generated English language translation for CN103400006A extracted from Thomson database on Dec. 2, 2016, 7 pages.

English language abstract and computer-generated English language translation for CN103400006B extracted from espacenet.com database on Jul. 12, 2018, 7 pages.

English language abstract for CN103966219A extracted from espacenet.com database on Jul. 23, 2018, 1 page.

(56) References Cited

OTHER PUBLICATIONS

English language abstract for CN104462650A extracted from espacenet.com database on Jul. 23, 2018, 1 page.
English language abstract for CN203665958U extracted from espacenet.com database on Jul. 23, 2018, 1 page.
English language abstract for CN204576946U extracted from espacenet.com database on Jul. 23, 2018, 1 page.
English language abstract for CN105741354A extracted from espacenet.com database on Jul. 23, 2018, 1 page.
English language abstract and computer-generated English language translation for DE3503577C2 extracted from Thomson database on Dec. 2, 2016, 4 pages.
English language abstract for EP2098850A2 extracted from espacenet.com database on Dec. 1, 2016, 1 page.
English language abstract and computer-generated English language translation for FR2018158A1 extracted from Thomson database on Dec. 2, 2016, 6 pages.
English language abstract and computer-generated English language translation for FR2700206A1 extracted from Thomson database on Dec. 2, 2016, 6 pages.
English language abstract and computer-generated English language translation for JP2006258752A extracted from Thomson database on Dec. 2, 2016, 5 pages.
English language abstract and computer-generated English language translation for JP5637030B2 extracted from Thomson database on Dec. 2, 2016, 8 pages.
English language abstract for KR20150121525A extracted from espacenet.com database on Jul. 23, 2018, 1 page.
European Search Report for European Application No. Ep 16202524.1 dated Feb. 21, 2017, 7 pages.
Extended European Search Report and Search Opinion for European Application No. EP 17 18 0980.9 dated Aug. 30, 2017, 8 pages.
European Search Report for European Patent Application No. EP 18152182.4 dated Mar. 1, 2018, 7 pages.
Doucleff, Michaeleen, "Engineers Create a Titanium Rib Cage Worthy of Wolverine", Nevada Public Radio Organization, Sep. 15, 2015, 4 pages; downloaded from http://www.npr.org/sectios/health-shots/2015/95/15/440361621/engineers-create-a-titani . . . On Oct. 19, 2017.
Jaskiewicz, Marek et al., "Overview and Analysis of Dummies Used for Crash Tests", Scientific Journals, vol. 35, No. 107, Jan. 1, 2013, XP055224571, pp. 22-31.
Rengier, F. et al., "3D Printing Based on Imaging Data: Review of Medical Applications", International Journal of Computer Assisted Radiology and Surgery, vol. 5, No. 4, May 15, 2010, XP05139721, pp. 335-341.
U.S. Appl. No. 15/847,498, filed Dec. 19, 2017, 19 pages.
European Search Report dated Feb. 15, 2017 for Application No. EP 16 19 3863.
Mendoza, Hannah Rose: "Training Pediatric Surgeons Using 3D Printed Rib Cages", 3Dprint.com, Nov. 3, 2014 (Nov. 3, 2014), XP002766702, Retrieved from the Internet: URL: //3dprint.com/22767/3d-printed-rib-cage/ [retrieved on Feb. 1, 2017] *the whole document*.
Chowdhry, Amit: "How Surgeons Implanted 3D-Printed Titanium Ribs in a Cancer Patient", Forbes, Sep. 19, 2015 (Sep. 19, 2015), XP002766703, Retrieved from the Internet: URL: http://www.forbes.com/sites/amitchowdhry/2015/09/19/how-surgeons-implanted-3d-printed-titanium-ribs-in-a-cancer-patient/#3ca5de9a9a09 [retrieved on Feb. 1, 2017] *the whole document*.
Lemmen, Paul et al.: "An Advanced Thorax-Shoulder Design for the THOR Dummy", Conference Proceedings Article, Jan. 1, 2013 (Jan. 1, 2013), XP055224574, *the whole document*.
Oakland Thermoplastics, "3D Manufacturing Materials", Studio FATHOM, Oct. 16, 2013, 3 pages.
Pandey, Ramji, "Photopolymers in 3D Printing Applications", Arcada, Degree Thesis, Plastics Technology, 2014, pp. 1-59.
Extended European Search Report and Search Opinion (EP 17 18 0978.3 O/R 710873.00153); dated Aug. 30, 2017.
Cimetrix Solutions, "3D Print Durable Parts with Real Thermoplastics", http://cimetrixsolutions.com/resources/technology/fdm, Sep. 5, 2015, 4 pages.
3DERS, "CAD House 3D Prints 1.7 Meter 5.6 Feet Fully Articulated Robotica", http://www.3ders.org/articles/20150211-cad-house-3d-prints-meter-fully-articulated-robotica.html, Feb. 13, 2015, 21 pages.

* cited by examiner

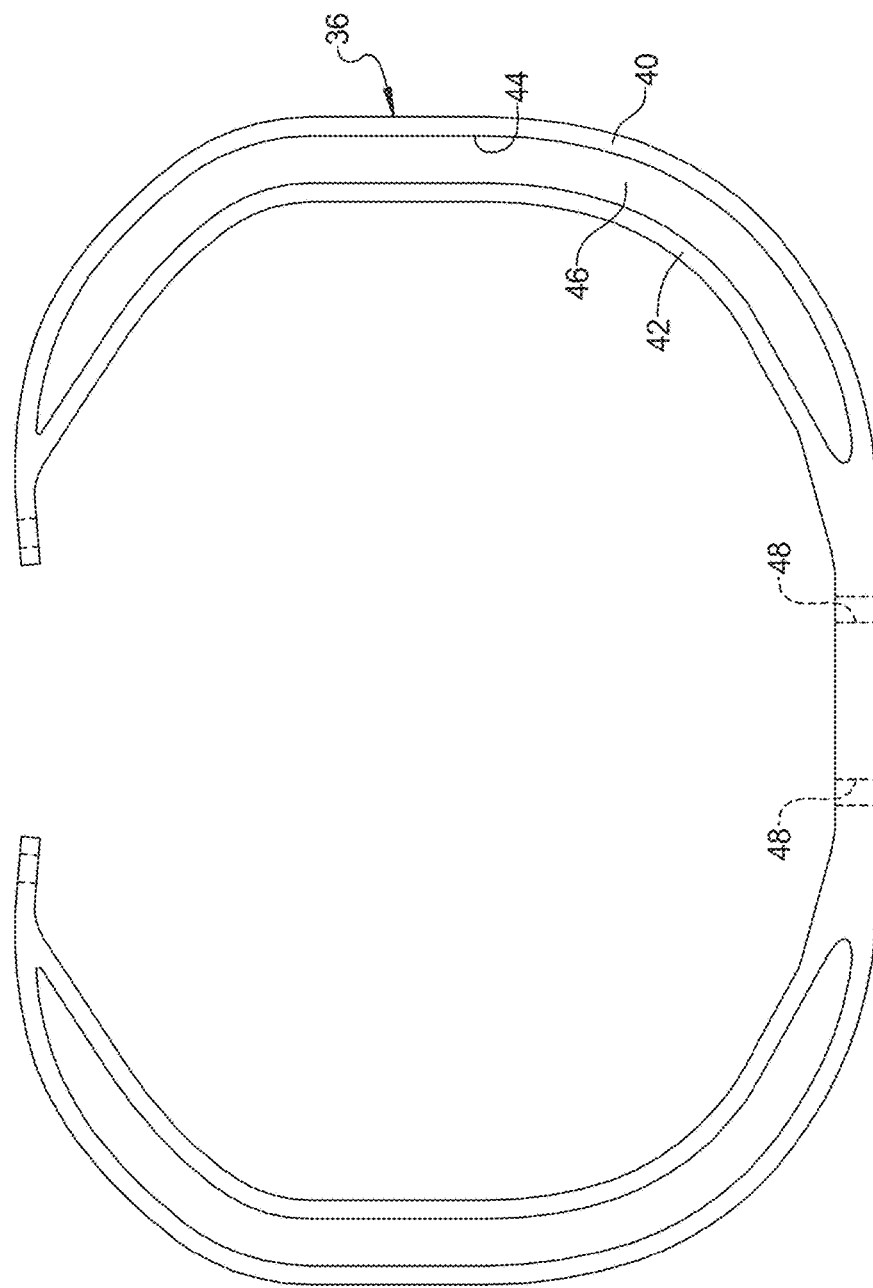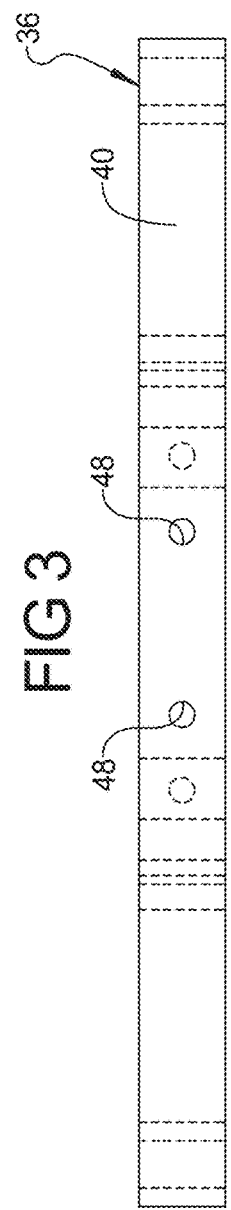

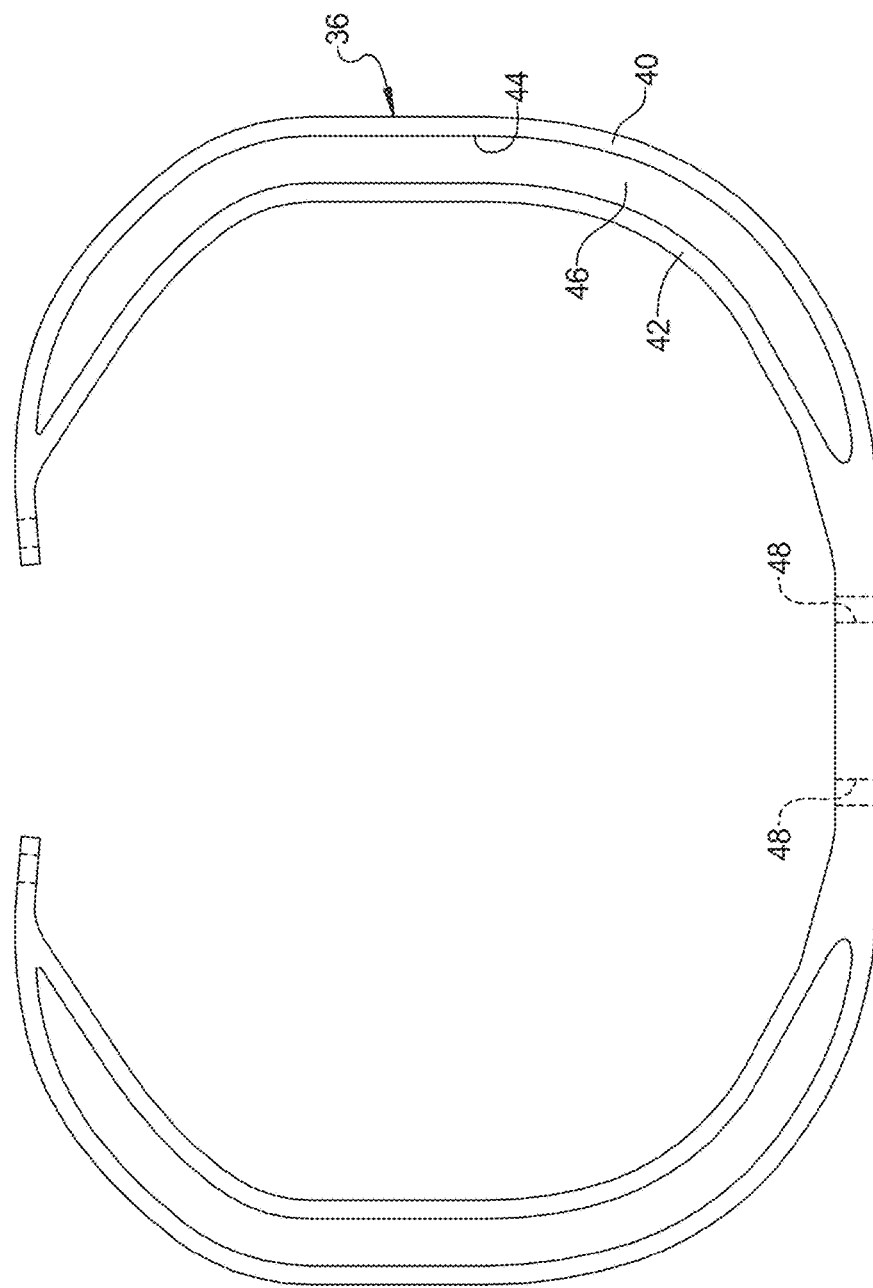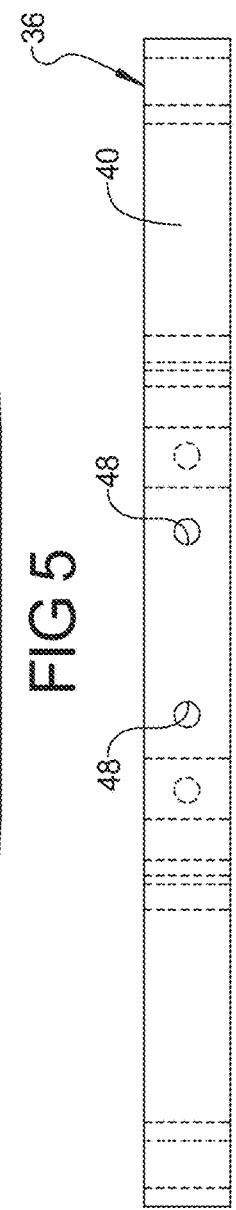
FIG 5
FIG 6

THREE-DIMENSIONAL RIBS AND METHOD OF THREE-DIMENSIONAL PRINTING OF RIBS FOR CRASH TEST DUMMY

CROSS-REFERENCE TO RELATED APPLICATION(S)

The present application claims the benefit of U.S. Provisional Patent Application, Ser. No. 62/241,548, filed Oct. 14, 2015, the entire disclosure of which is hereby expressly incorporated by reference.

BACKGROUND OF THE INVENTION

1. Field of the Invention

The present invention relates generally to crash test dummies and, more particularly, to three-dimensional ribs and a method of three-dimensional printing of ribs for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle, authorities examine vehicles to submit type approval, and consumer organizations provide information on vehicle safety ratings to the public.

Collision testing often involves the use of anthropomorphic test devices, better known as "crash test dummies", to estimate a human's injury risk. The dummy must possess the general mechanical properties, dimensions, masses, joints, and joint stiffness of the humans of interest. In addition, they must possess sufficient mechanical impact response similitude and sensitivity to cause them to interact with the vehicle's interior in a human-like manner.

The crash test dummy typically includes a head assembly, spine assembly (including neck), rib cage assembly, abdomen, pelvis assembly, right and left arm assemblies, and right and left leg assemblies. Generally, the rib cage assembly includes a plurality of ribs. The ribs are typically connected to the spine assembly.

Three-dimensional (3D) printers and rapid prototyping (RP) systems are currently used primarily to quickly produce objects and prototype parts from 3D computer-aided design (CAD) tools. Most RP systems use an additive, layer-by-layer approach to building parts by joining liquid, powder, or sheet materials to form physical objects. The data referenced in order to create the layers is generated from a CAD system using thin, horizontal cross-sections of a CAD model.

Currently, the ribs of the crash test dummy use "free layer" damping. This type of construction glues damping material to the inside of a standard 1095 steel band to create the rib. However, it is desirable to make ribs that are more human-like. Thus, there is a need in the art for new ribs having constrained layer damping made by a three-dimensional printing process for a crash test dummy.

SUMMARY OF THE INVENTION

Accordingly, the present invention provides a three-dimensional rib for a crash test dummy. The rib includes at least two layers of a band material and a layer of damping material sandwiched in between the at least two layers of the band material.

Further, the present invention provides a method of making a three-dimensional rib for a crash test dummy. The method includes the step of providing a three-dimensional printer. The method also includes the steps of making a CAD model of the rib and printing, by the three-dimensional printer, the rib with at least two layers of a band material and a layer of damping material sandwiched in between the at least two layers of the band material.

Also, the present invention provides a rib cage assembly for a crash test dummy including a plurality of three-dimensional ribs. Each of the ribs includes at least two layers of a band material and a layer of damping material sandwiched in between the at least two layers of the band material.

In addition, the present invention provides a crash test dummy including a body and a rib cage assembly operatively attached to the body. The rib cage assembly includes a plurality of three-dimensional ribs. Each of the ribs includes at least two layers of a band material and a layer of damping material sandwiched in between the at least two layers of the band material.

One advantage of the present invention is that a new three-dimensional rib is provided for a crash test dummy. Another advantage of the present invention is that the rib includes at least two layers of a band material and a layer of damping material sandwiched in between the layers of the band material to provide a three-dimensional rib having constrained layer dampening. Yet another advantage of the present invention is that a three-dimensional printing process is used to make ribs more humanlike than ever before. Still another advantage of the present invention is that the three-dimensional printing process allows printing of at least two different materials at one printing.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 3 is a top view of one embodiment of a three-dimensional rib for the rib cage assembly of FIGS. 1 and 2.

FIG. 4 is a side view of the three-dimensional rib of FIG. 3.

FIG. 5 is a top view of another embodiment of a three-dimensional rib for the rib cage assembly of FIGS. 1 and 2.

FIG. 6 is a side view of the three-dimensional rib of FIG. 5.

DESCRIPTION OF THE PREFERRED EMBODIMENT(S)

Figure 1:
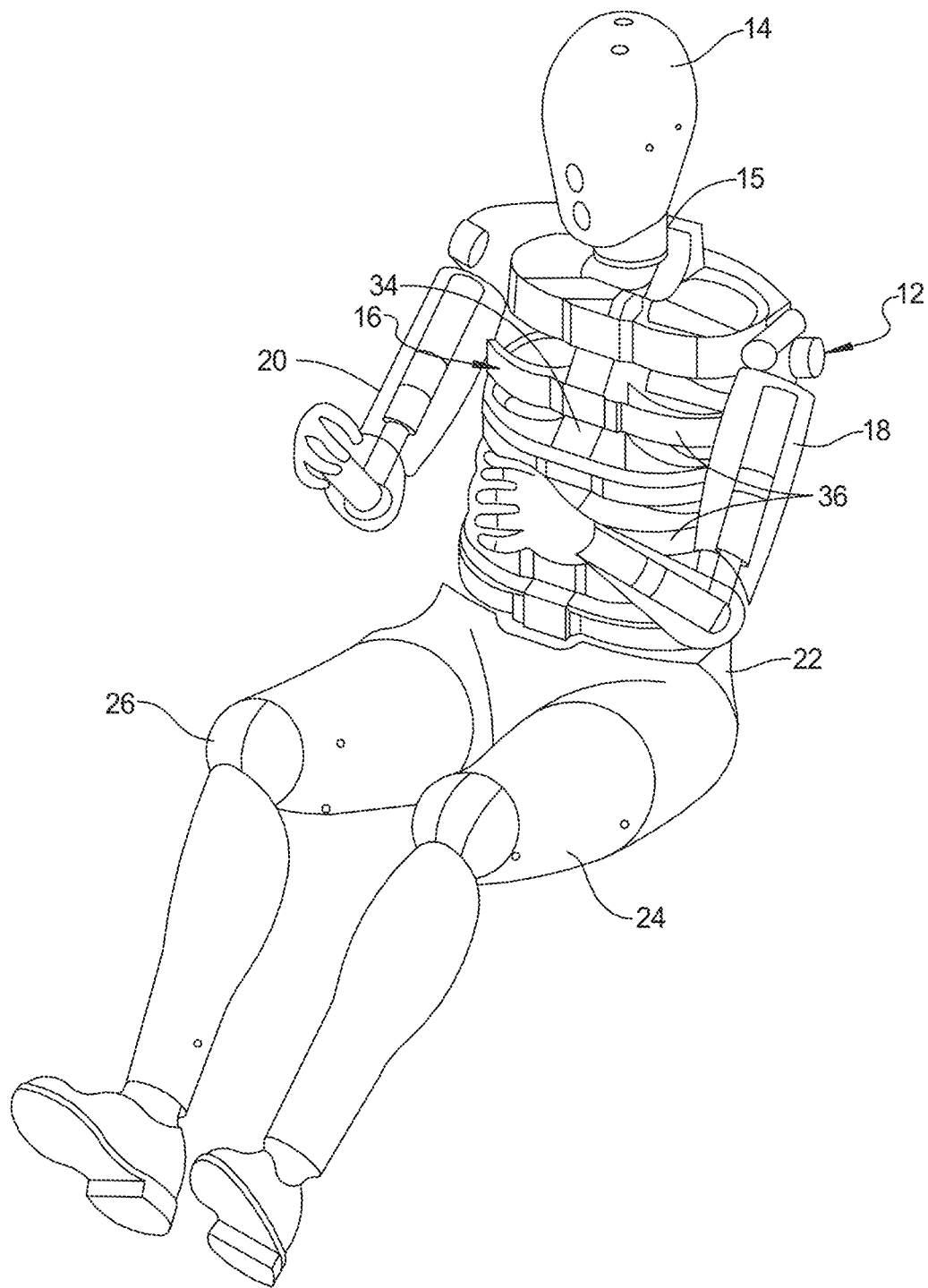
FIG. 1 is a perspective view of one embodiment of a rib cage assembly, according to the present invention, illustrated in operational relationship with a crash test dummy.
Figure 2:
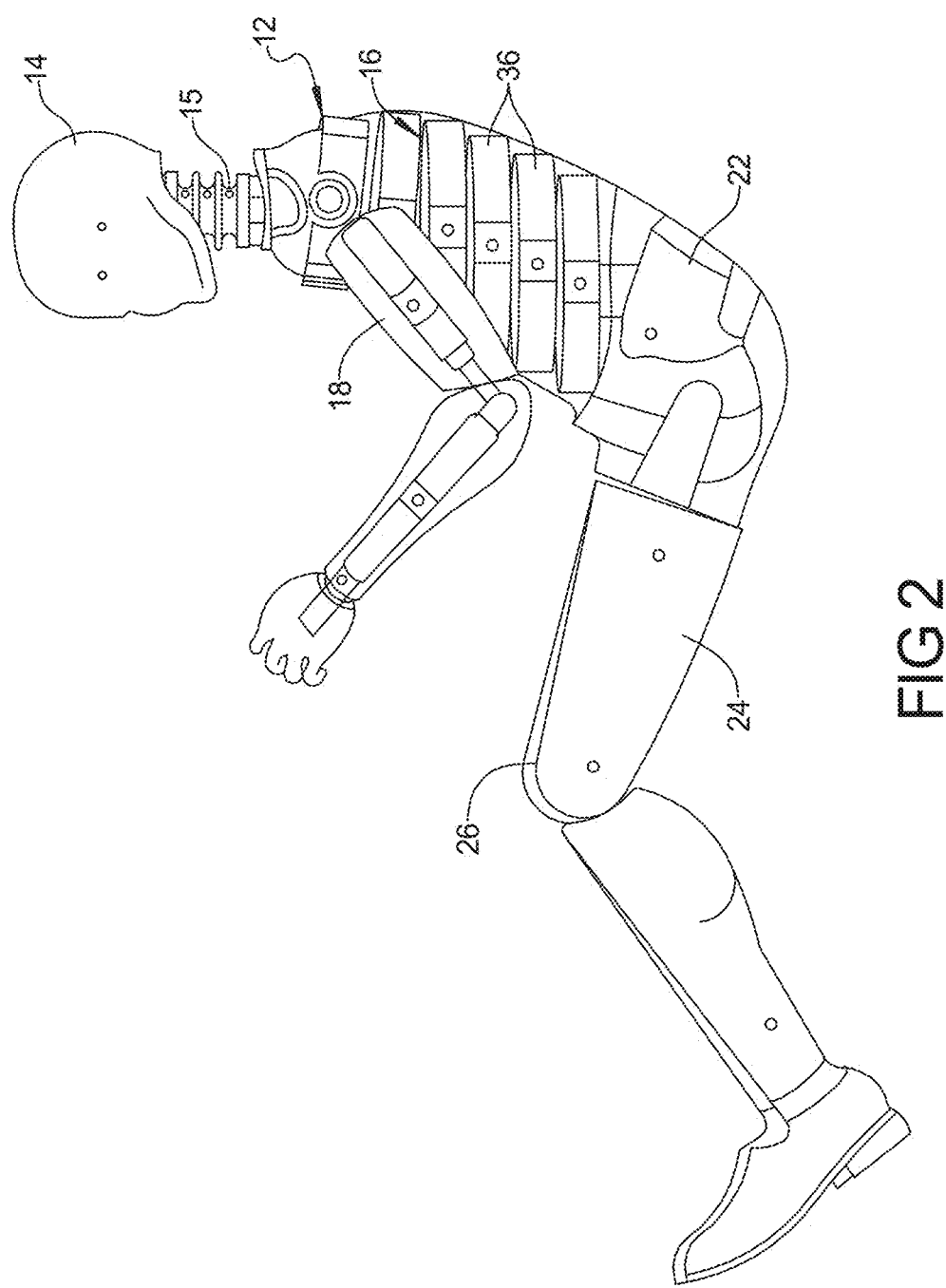
FIG. 2 is a side view of the rib cage assembly illustrated in operational relationship with the crash test dummy of FIG. 1.

Referring to the drawings and in particular FIGS. 1 and 2, one embodiment of a crash test dummy, generally indicated at 12. The crash test dummy 12 is of a fifth percentile (5%) female type and is illustrated in a sitting position. This crash test dummy 12 is used primarily to test the performance of automotive interiors and restraint systems for adult front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As illustrated in FIGS. 1 and 2, the crash test dummy 12 includes a head assembly 14, which includes a one-piece plastic skull, an instrumentation core, and a vinyl skin. The instrumentation core is removable for access to head instrumentation contained inside the head assembly 14.

The crash test dummy 12 also includes a spine assembly 15 having an upper end mounted to the head assembly 14 by a nodding block (not shown) and a nodding joint (not shown). The spine assembly 15 has a lower end extending into a torso area of the crash test dummy 12 and is connected to a spine mounting weldment (not shown) by an adapter assembly (not shown).

The crash test dummy 12 includes a torso or rib cage assembly 16 connected to the spine assembly 15. The spine assembly 15 also includes a neck (not shown) connected to the head assembly 14 and a spine box (not shown) connected to the neck. The neck has a lower end connected to by a suitable attachment such as one or more fasteners (not shown) to the spine box. It should be appreciated that the fasteners threadably engage apertures (not shown) in the spine box to secure the neck to the spine box. The crash test dummy 12 also has a pair of arm assemblies including a right arm assembly 18 and a left arm assembly 20, which are attached to the crash test dummy 12. The left arm assembly 20 includes a clavicle link (not shown), which connects a clavicle (not shown) to the top of the spine assembly 15. It should be appreciated that the right arm assembly 18 is constructed in a similar manner.

As illustrated in the FIGS. 1 and 2, a lower end of the lumbar spine is connected to a lumbar-thoracic adapter (not shown), which is connected to a lumbar to pelvic adapter (not shown). The crash test dummy 12 includes a pelvis assembly 22 connected to the adapter. The crash test dummy 12 also includes a right leg assembly 24 and a left leg assembly 26, which are attached to the pelvis assembly 22. It should be appreciated that various components of the crash test dummy 12 are covered in a urethane skin such as a flesh and skin assembly (not shown) for improved coupling with the skeleton of the crash test dummy 12. It should also be appreciated that a lifting ring (not shown) may be attached to the head assembly 14 for lifting the crash test dummy 12 into and out of test fixtures and vehicles.

Referring to FIGS. 1 and 2, the rib cage assembly 16 includes one or more three-dimensional ribs 36. The ribs 36 extend between the spine box and a sternum 34. As illustrated in one embodiment in FIGS. 3 and 4 for a rib #3 and another embodiment of FIGS. 5 and 6 for a rib #4, the ribs 36 are generally arcuate and rectangular in shape, but may be any suitable shape. The ribs 36 are vertically spaced along the spine box and sternum 34. The ribs 36 are connected to the spine box and sternum 34 by a suitable mechanism such as fasteners (not shown).

Each of the ribs 36 has a general "C" shape. Each rib 36 has at least two layers. In one embodiment, each rib 36 has a front layer 40 and a rear layer 42 with an interior 44 spaced therebetween. The front layer 40 and rear layer 42 are made of a band material. Each layer 40 and 42 has a thickness from approximately 2.0 millimeters to approximately 6.0 millimeters, preferably approximately 4.0 millimeters. Each rib 36 includes a layer of damping material 46 disposed or sandwiched in between the two layers 42 and 44. The damping material has a thickness from approximately 8.0 millimeters to approximately 10.0 millimeters, preferably approximately 9.5 millimeters. Each rib 36 includes at least one, preferably a plurality of apertures 48 to allow fasteners (not shown) to extend therethrough for connection of the rib cage assembly 16 to the crash test dummy 12. The printable materials for the rib are commercially available from Stratasys Ltd., 7665 Commerce Way, Eden Prairie, Minn., 55344. It should be appreciated that the materials are either FDM Thermoplastics or Polyjet Photopolymers of Stratasys Ltd. It should also be appreciated that the dimensions and thicknesses of the ribs 36 will vary depending on the crash test dummy. It should also be appreciated that this process could be applied to other rib designs as well, for example, bigger, smaller, and different shapes.

Figure 7:
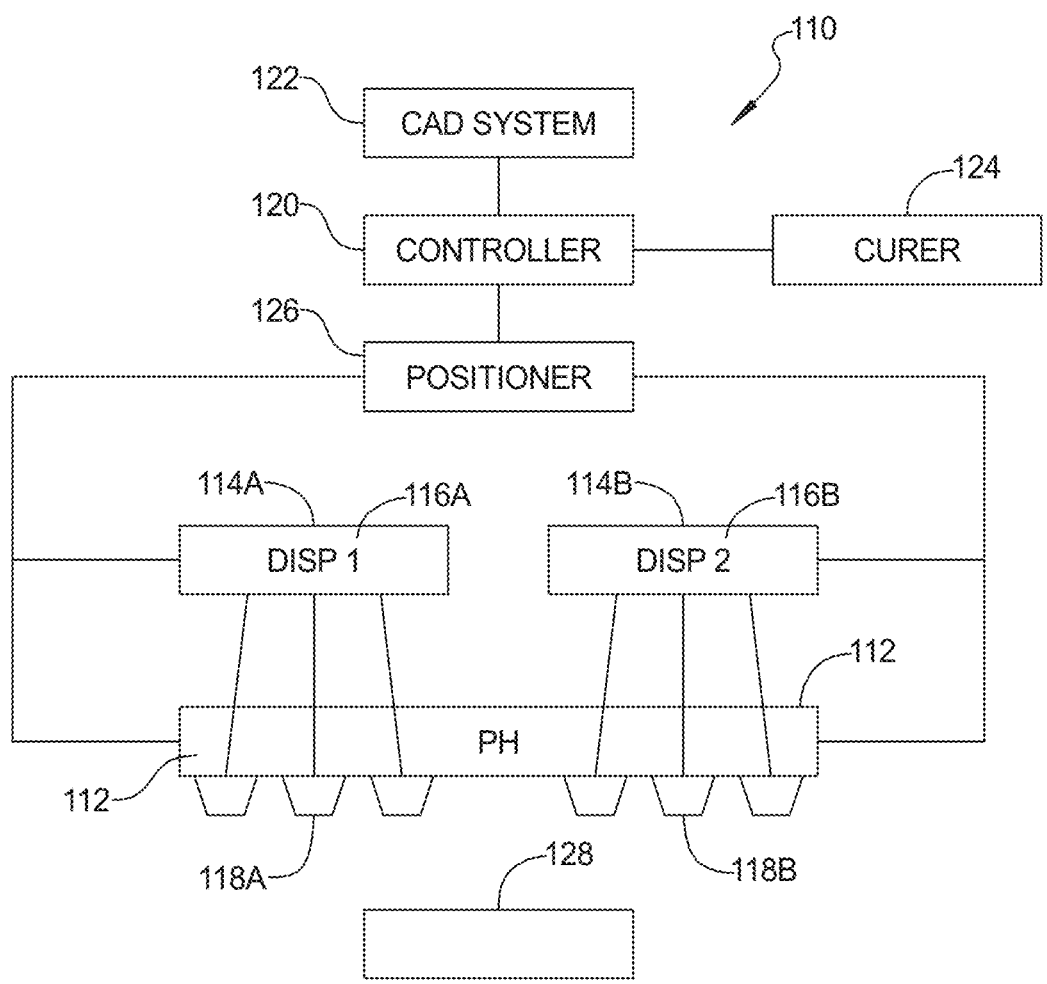
FIG. 7 is a schematic view of one embodiment of a three-dimensional printing system for printing the three-dimensional ribs of FIGS. 3 through 6.

Referring to FIG. 7, a three-dimensional printer or printing system, generally designated 100, includes one or more printing heads 112, and at least two dispensers 114 and individually referenced 114a and 114b, containing printable materials, generally referenced 116 and individually referenced 116a and 116b, respectively. It should be appreciated that other components, and other sets of components, may be used.

The printing head 112 has a plurality of ink-jet type nozzles 118, through which printable materials 116a and 116b are jetted. In one embodiment, the first dispenser 114a is connected to a first set of nozzles 118a, and second dispenser 114b is connected to a second set of nozzles 118b. Thus first printable material 116a is jetted through the nozzles 118a, and the second printable material 116b is jetted through nozzles 118b. In another embodiment (not shown), the three-dimensional printing system 110 may include at least two printing heads 112. The first printing head 112 is connected to first dispenser 114a and is used to jet first printable material 116a; and the second printing head 112 is connected to second dispenser 114b is used to jet second printable material 116b.

The three-dimensional printing system 110 further includes a controller 120, a Computer Aided Design (CAD) system 122, a curing unit 124, and optionally a positioning apparatus 126. The controller 120 is coupled to the CAD system 122, curing unit 124, positioning apparatus 126, printing head 112 and each of the dispensers 114. It should be appreciated that control may be effected by other units than shown, such as one or more separate units.

The three-dimensional rib 36 is built in layers, the depth of each layer typically being controllable by selectively adjusting the output from each of the ink-jet nozzles 118.

By combining or mixing materials from each of the dispensers 114, wherein each dispenser 114 contains printable material having a different hardness, it is possible to adjust and control the hardness of the material forming the three-dimensional rib 36 being produced. Thus, by combining the first and second interface materials being output from each of the dispensers 114, respectively, different parts of the three-dimensional rib 36 having a different modulus of elasticity and a different strength may be produced. It should be appreciated that such a three-dimensional printing system is disclosed in U.S. Pat. No. 8,481,241 to Napadensky et al., the entire disclosure of which is hereby expressly incorporated by reference.

Figure 8:
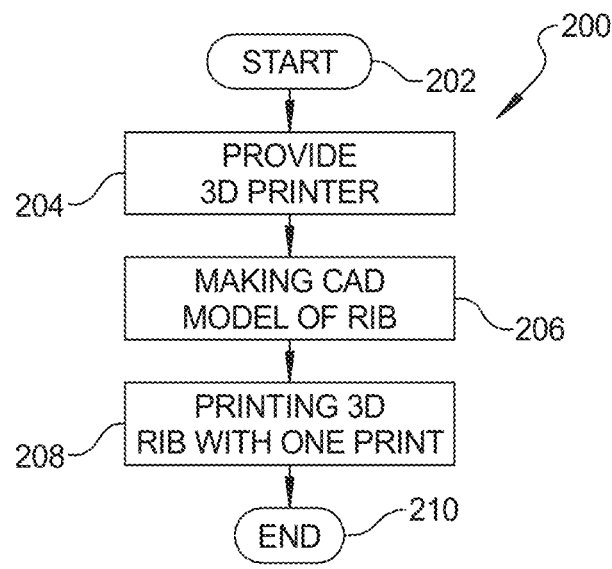
FIG. 8 is a flowchart of a method, according to the present invention, for three-dimensional printing of the three-dimensional ribs of FIGS. 3 through 6.

Referring to FIG. 8, the present invention provides a method 200, according to one embodiment of the present invention, of making the three-dimensional rib 36 for the crash test dummy 12. The method 200 starts in bubble 202 and advances to block 204. In block 204, the method 200 includes the step of providing a three-dimensional printer or printing system 110. The method 200 advances to block 206 and includes the step of making a CAD model of the rib 36. In one embodiment, a CAD model of the rib 36 was made to allow the 3D printer to print in one model. The method 200 advances to block 208 and includes the step of printing, by the three-dimensional printer or printing system 110, the rib 36 with at least two layers 40, 42 of a band material and a layer 46 of damping material sandwiched in between the layers 40, 42 of the band material in one printing.

Accordingly, rib 36 and the rib cage assembly 16 of the present invention has ribs 36 that are even more humanlike than in the past. Due to the advantage of the three-dimensional printing of two different materials in one printing, the ribs 36 can include hysteresis or damping that can be increased to make the ribs 36 more humanlike than ever before.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A method of making a three-dimensional rib for a crash test dummy, the method comprising the steps of:
   providing a three-dimensional printer;
   making a CAD model of the rib for the crash test dummy, wherein the model of the rib forms a first rectangular cross section comprising a damping layer sandwiched between two band layers, the first rectangular cross section extends along an axis perpendicular to the first rectangular cross section to form an arcuate length terminated at opposing ends, and each of the opposing ends forms a second rectangular cross section comprising a unitary band layer without a damping layer that extends away from the adjoined first rectangular cross section damping layer along the axis; and
   printing, by the three-dimensional printer, the CAD model using a band material to form the band layers and a damping material to form the damping layer.

2. A method as set forth in claim 1 wherein said band material is FDM Thermoplastics or Polyjet Photopolymers.

3. A method as set forth in claim 1 wherein said damping material is FDM Thermoplastics or Polyjet Photopolymers.

4. A method as set forth in claim 1 wherein said step of printing comprises printing the band layers and the damping layer in one printing.

5. A method as set forth in claim 1 wherein the damping layer has a thickness of approximately 9.5 millimeters.

6. A method as set forth in claim 1 wherein each of the band layers has a thickness of approximately 4.0 millimeters.

7. A method as forth in claim 1, wherein the model of the rib includes at least one aperture formed within the rib for securing the rib in the crash test dummy.

8. A method as set forth in claim 1, wherein the opposing ends, axis, and arcuate length are respectively first opposing ends, a first axis, and a first arcuate length, the model of the rib forms a third rectangular cross section comprising a damping layer sandwiched between two band layers, the third rectangular cross section extends along a second axis perpendicular to the third rectangular cross section to form a second arcuate length terminated at second opposing ends, each of the second opposing ends forms a fourth rectangular cross section comprising a unitary band layer without a damping layer, one of the second opposing ends extends away from the adjoined third rectangular cross section damping layer along the second axis and adjoins one of the first opposing ends, and the others of the first and second opposing ends respectively extend from the adjoined first rectangular cross section damping layer along the first axis and the adjoined third rectangular cross section damping layer along the second axis and do not contact each other.

9. A method as set forth in claim 1, wherein the damping layer is exposed to the environment of the rib on opposing sides of the arcuate length parallel to the axis within the model.

10. A system for making a three-dimensional rib for a crash test dummy, the system comprising:
    a three-dimensional printer; and
    a controller coupled to the three-dimensional printer and configured to:
       generate a CAD model of the rib for the crash test dummy, wherein the model of the rib forms a first rectangular cross section comprising a damping layer sandwiched between two band layers, the first rectangular cross section extends along an axis perpendicular to the first rectangular cross section to form an arcuate length terminated at opposing ends, and each of the opposing ends forms a second rectangular cross section comprising a unitary band layer without a damping layer that extends away from the adjoined first rectangular cross section damping layer along the axis; and
       print, via the three-dimensional printer, the CAD model using a band material to form the band layers and a damping material to form the damping layer.

11. The system of claim 10 wherein said band material is FDM Thermoplastics or Polyjet Photopolymers.

12. The system of claim 10 wherein said damping material is FDM Thermoplastics or Polyjet Photopolymers.

13. The system of claim 10 wherein the controller is configured to print, via the three-dimensional printer, the band layers and the damping layer in one printing.

14. The system of claim 10 wherein the damping layer has a thickness of approximately 9.5 millimeters.

15. The system of claim 10 wherein each of the band layers has a thickness of approximately 4.0 millimeters.

* * * * *